United States Patent
Shivaram et al.

(10) Patent No.: US 9,569,850 B2
(45) Date of Patent: Feb. 14, 2017

(54) SYSTEM AND METHOD FOR AUTOMATICALLY DETERMINING POSE OF A SHAPE

(71) Applicant: Cognex Corporation, Natick, MA (US)

(72) Inventors: Guruprasad Shivaram, Chestnut Hill, MA (US); Lowell D. Jacobson, Grafton, MA (US); David Y. Li, West Roxbury, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/515,481

(22) Filed: Oct. 15, 2014

(65) Prior Publication Data

US 2015/0104068 A1 Apr. 16, 2015

Related U.S. Application Data

(60) Provisional application No. 61/891,446, filed on Oct. 16, 2013.

(51) Int. Cl.
*G06K 9/00* (2006.01)
*G06T 7/00* (2006.01)
*G06K 9/46* (2006.01)
*G06K 9/62* (2006.01)

(52) U.S. Cl.
CPC ........... *G06T 7/0044* (2013.01); *G06K 9/4604* (2013.01); *G06K 9/6206* (2013.01); *G06T 2207/20081* (2013.01); *G06T 2207/30164* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 6,137,902 A | 10/2000 | Kinoshita et al. | |
| 6,336,082 B1 * | 1/2002 | Nguyen | G06K 9/6255 340/658 |
| 6,904,151 B2 | 6/2005 | Deguillaume et al. | |
| 7,062,093 B2 | 6/2006 | Steger | |

(Continued)

FOREIGN PATENT DOCUMENTS

| | | |
|---|---|---|
| EP | 1193642 A1 | 4/2002 |
| WO | 2012012576 A1 | 1/2012 |

*Primary Examiner* — Tahmina Ansari
(74) *Attorney, Agent, or Firm* — Loginov & Associates

(57) ABSTRACT

This invention provides a system and method for determining the pose of shapes that are known to a vision system that undergo both affine transformation and deformation. The object image with fiducial is acquired. The fiducial has affine parameters, including degrees of freedom (DOFs), search ranges and search step sizes, and control points with associated DOFs and step sizes. Each 2D affine parameter's search range and the distortion control points' DOFs are sampled and all combinations are obtained. The coarsely specified fiducial is transformed for each combination and a match metric is computed for the transformed fiducial, generating a score surface. Peaks are computed on this surface, as potential candidates, which are refined until a match metric is maximized. The refined representation exceeding a predetermined score is returned as potential shapes in the scene. Alternately the candidate with the best score can be used as a training fiducial.

21 Claims, 13 Drawing Sheets

(56) References Cited

U.S. PATENT DOCUMENTS

| | | |
|---|---|---|
| 8,103,085 B1 | 1/2012 | Zadeh |
| 8,260,059 B2 | 9/2012 | Hofhauser et al. |
| 8,750,560 B2 | 6/2014 | Sharma et al. |
| 8,787,671 B2 | 7/2014 | Ahn et al. |
| 2004/0175057 A1 | 9/2004 | Tsao et al. |
| 2007/0019846 A1* | 1/2007 | Bullitt .................. G06T 7/0014 382/128 |
| 2009/0016608 A1 | 1/2009 | Fujimoto et al. |
| 2011/0080476 A1 | 4/2011 | Dinauer et al. |
| 2012/0020573 A1* | 1/2012 | Kacenjar ............... G06T 3/0068 382/218 |
| 2014/0323845 A1* | 10/2014 | Forsberg ............... A61B 5/4561 600/407 |
| 2015/0104068 A1* | 4/2015 | Shivaram ............. G06T 7/0044 382/103 |

* cited by examiner

SYSTEM AND METHOD FOR AUTOMATICALLY DETERMINING POSE OF A SHAPE

RELATED APPLICATIONS

This application claims the benefit of U.S. Provisional Application Ser. No. 61/891,446, filed Oct. 16, 2013, entitled LOCATING FIDUCIALS WITH KNOWN SHAPE, the entire disclosure of which is herein incorporated by reference.

FIELD OF THE INVENTION

This invention relates to machine vision systems and methods for locating shapes in an imaged scene.

BACKGROUND OF THE INVENTION

Machine vision systems, also termed "vision systems" herein are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone). Some types of tasks performed by the vision system can include inspection of objects and surfaces and/or alignment of objects (also termed "workpieces") on a moving motion stage, which can include servoing the motion stage along one or more orthogonal axes and/or in rotation.

Alignment of a workpiece often requires identification and location of a predetermined shape, that can be termed a "fiducial". As part of the alignment process, the fiducial is recognized on the image, and its "pose" in 2-dimensions (2D) or three-dimensions (3D) is determined. Based upon determination of the pose, the workpiece can be aligned to perform a manufacturing operation, such as assembly of components.

Often, the shape of the fiducial (e.g. a cross) is trained into the vision system as part of its initial setup. This training is based on either a synthetic or actual image of the fiducial. It is recognized that the fiducial can be distorted. Such distortion can be the result of the process that generates the shape/fiducial. For example, the printing of a cross-shaped fiducial can give rise to process variations that can result in a variation in the cross stroke width. In the case of a cross and circle, stroke width can vary and part of the circle can be flattened, resulting in an edge that defines an oval or spline. While vision system applications that search for affine transformation (i.e. changes in scale, rotation, translation and skew, typically in 2D) can identify and locate (determine pose of) a fiducial with relative efficiency, the inclusion of distortion in combination with affine transformation, can make the process of determining fiducial pose more challenging and less reliable/efficient.

SUMMARY OF THE INVENTION

This invention overcomes disadvantages of the prior art by providing a system and method for determining the pose of shapes that are known to a vision system that undergo both affine transformation and deformation in a manner that increases efficiency and reliability. In an illustrative embodiment, this system and method acquires an object image with fiducial. The fiducial (shape) is specified along with a coarse estimate of affine parameters, and search ranges and search step sizes for the affine degrees of freedom (DOFs). Likewise, it includes one or more distortion control points with associated DOFs and step sizes. The system and method samples each 2D affine parameter's search range and the distortion control points' degrees of freedom (DOF). For every combination of the above samples, the system and method transforms the coarsely specified fiducial and computes a match metric for the transformed fiducial shape in the image. This computation results in a score surface. A set of peaks are computed on this score surface. These peaks are potential candidates in the image. Each candidate is then refined using, illustratively, a hill climbing approach where the coarse estimate of the parameters is iteratively modified until the match metric is maximized. The refined representation of the candidates which exceed a predetermined (e.g. user-specified) score is returned. The refined representation (s) can indicate the locations of one or more fiducials in the runtime image. Alternatively, the refined representation(s) with the best score can be used to refine a coarsely specified synthetic training fiducial. This refined training fiducial can be used to train follow-on runtime pose determination processes.

In an illustrative embodiment, a system and method for automatically determining pose of a shape undergoing a combination of affine deformation and non-linear deformation with a vision system is provided, with associated processes and process steps. The system and method employs a camera assembly and associated vision system processor/process to acquire an image of an object containing the shape. The system and method performs a coarse location of the shape, typically by searching a user-specified search range of affine parameters and non-linear distortion parameters, to identify and select at least one shape candidate matching a predetermined shape. Affine parameters and non-linear distortion parameters are refined for one or more (at least one) best matching candidate shape(s), and a shape representation of the refined best matching candidate shape (s) is generated. This result is typically employed in training shapes for use in follow-on runtime pose determination processes by the vision system. The inclusion of distortion information increases the robustness of the system in locating fiducials.

Illustratively, the affine deformation is defined by one or more two-dimensional (2D) affine degrees of freedom and the non-linear deformation is defined by at least one of stroke width and spline warp. The performance of coarse location comprises moving at least one control point relative to the predetermined shape iteratively to a plurality of control point configurations from a nominal position over a plurality steps based on a predetermined step size and search range. For each control point configuration, the system and method can iteratively compute affine transforms relative to the predetermined shape over a plurality of steps based upon a predetermined step size and search range for at least one affine degree of freedom (DOF). In various examples of fiducials/shapes analyzed by the system and method, the shape define: (a) a cross with orthogonally oriented arms each defining a stroke width and at least one control point defined by a single point located at an intersecting corner of the arms—wherein the control point is located in a predetermined quadrant with respect to the arms thereby defining a valid shape; (b) a circle or annulus combined with the cross and further comprising another control point, respectively located on each edge of the circle or annulus.

In illustrative embodiments, the system and method can employ a hierarchical approach in which the fiducial/shape (e.g. cross, circle with cross, or annulus with cross) is decomposed into more basic constituent shapes and with an order of processing based upon a predetermined hierarchy. In this approach the system and method moves at least one control point, for each more basic shape relative to each more basic shape iteratively to a plurality of control point configurations from a nominal position over a plurality of steps based on a predetermined step size and search range. The system and method also iteratively computes, for each control point configuration, affine transforms relative to the more basic shape over a plurality of steps based upon a predetermined step size and search range for at least one affine degree of freedom (DOF). Illustratively, a fiducial renderer decomposes the shape into more basic shapes, and the hierarchy comprises an order from the shape with largest perimeter to the shape with smallest perimeter. In general the size of steps used by the system and method can be defined based upon user parameters or an automatic process.

The system and method illustratively computes a score for each of a plurality of combinations of control point configurations and affine transforms and provides from this computation a score surface in space spanned by affine DOFs and control point DOFs. The system and method then selects a set of peaks on the score surface and refines each peak. The selection and refinement can further comprise the selection of one or more of the highest-scoring of the combinations as the shape representation or the location of multiple instances of the shape in the image. The computation of the score can also comprise generating a gradient image and defining probes along edges of the gradient image, and the computation of the score can be based upon an average value of a dot product between the probes and interpolated gradient values at corresponding locations in the gradient image. Additionally, the computation of the score by the system and method can comprise a maximization of the score using a hill climbing approach. A sub-sampled representation of the fiducial/shape(s) can be obtained, to sub-pixel accuracy by performing the coarse location and refining the affine parameters and non-linear distortion parameters at progressively finer step sizes iteratively. The shape representation is used as a model image in either, or both, a runtime fiducial location operation and/or the generation of a synthetic fiducial image model. The system and method can establish a boundary around the shape and a unit shape relative to the boundary. Illustratively, the shape representation can be used to locate one or more fiducial/shape(s) during runtime operation of the vision system or to refine a synthetic shape based upon the image of the fiducial/shape for training a vision system tool.

BRIEF DESCRIPTION OF THE DRAWINGS

The invention description below refers to the accompanying drawings, of which.

DETAILED DESCRIPTION

I. Vision System Overview

Figure 1:
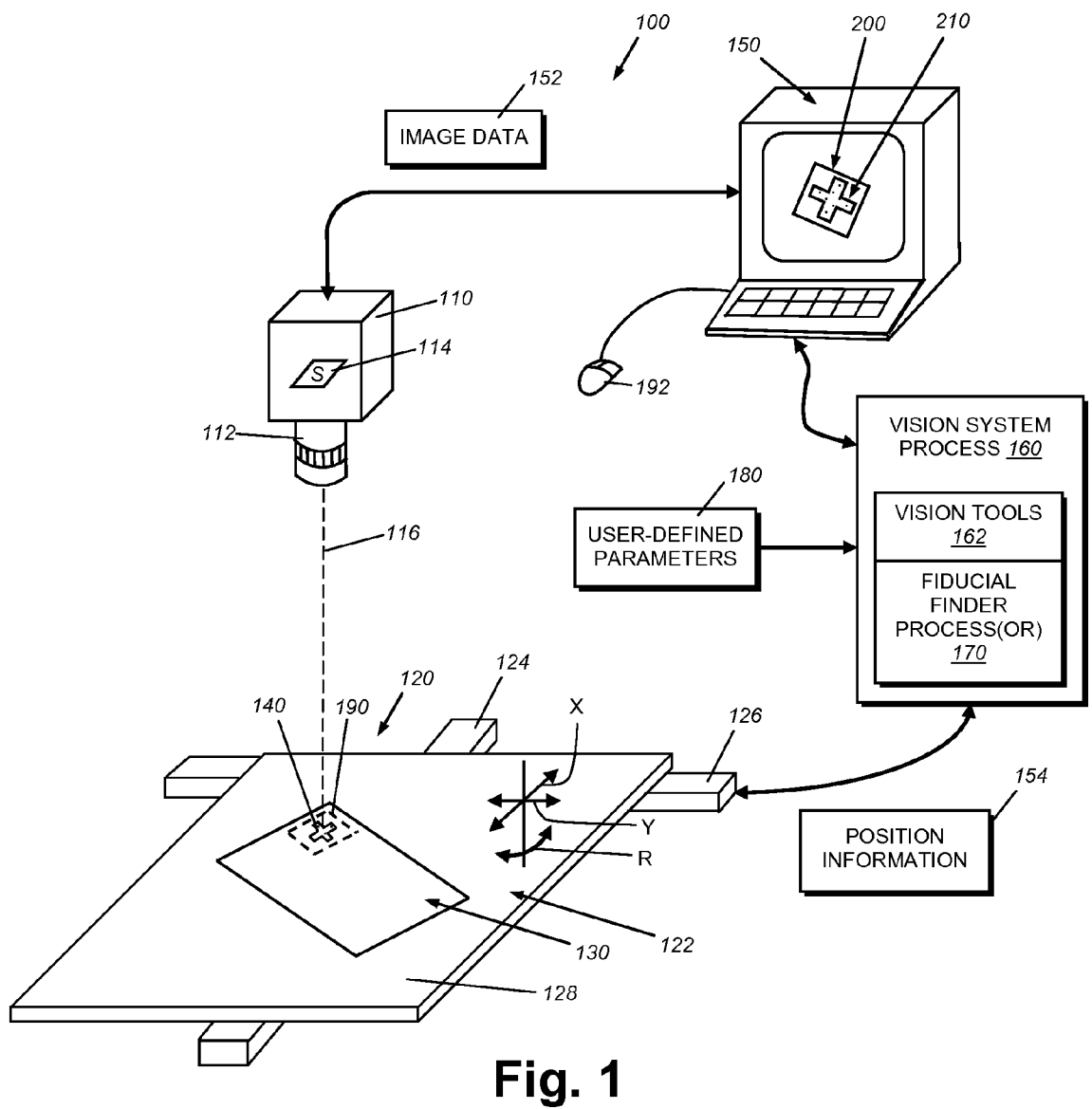
FIG. 1 is a diagram of a vision system acquiring an image of a scene containing a motion stage and a workpiece having an exemplary cross-shaped fiducial, in which the vision system is arranged to operate a fiducial finder process/processor for locating the exemplary cross-shaped fiducial according to an illustrative embodiment.

FIG. 1 shows an exemplary machine vision system arrangement (also herein termed a "vision system") 100 in which a camera 110 having an appropriate optics assembly (e.g. a lens package 112 and image sensor (also termed an "imager") 114, constructed using CCD, CMOS or a similar technology), is aligned along an optical axis (dashed line 116) to image a scene 120. The scene in this embodiment includes a motion stage assembly 122, which employs actuators 124 and 126 to generate motion along orthogonal x and y axes, as well as a rotation direction (curved double arrow R) within a common plane defined by the base 128 of the stage 122. This motion stage 122 and its relative motion directions is exemplary of a wide range of possible arrangements for translating/positioning a workpiece 130, or any other object or surface, in a number of directions that can generate a variety of changing viewing conditions.

The imaged workpiece 130 defines a surface that is typically flat and contains at least one feature 140 with predetermined elements that is alternatively referred to as a "fiducial". The vision system 100 is tasked with locating this fiducial relative to the image field of view (FOV). In the depicted example, the fiducial 140 is defined as a cross with orthogonal/perpendicular arms.

The camera 110 in this embodiment is linked to a dedicated or general purpose computer and/or processor 150 that receives, stores and manipulates image data 152 using a vision system process/processor 160 that interoperates with an operating system and other associated applications and programs running on the computer 150. Other associated devices and functions, such as a framegrabber, video-capture card, and/or various illuminators/illumination control devices (not shown) can be employed by the system 100 as appropriate and in manner known to those of skill. Also, it is expressly contemplated that some or all of the vision system processes and/or processors can be self-contained within the camera body in alternate embodiments. Data collected by the vision system can be stored or used for other processes, such as part manipulation. As shown the motion stage 128 communicates position data 154 with the vision system process/processor in order to control motion, and provide position feedback, with respect to the motion stage 128 and workpiece 130. This can be used to control the position of the workpiece 130 by the translation and rotation stages to place it in a proper orientation for further manufacturing tasks once the position of the fiducial has been determined by the vision system using the processes described herein.

In an illustrative embodiment, the vision system process/processor 160 contains a variety of vision tools 162 that are known to those of skill, including, but not limited to blob tools, edge finders, calipers and other appropriate functions and processes that enable the vision system to locate and analyze features in an acquired image (typically undergoing affine transformation). These tools can be sourced, for example, from Cognex Corporation of Natick, Mass., including the well-known PatMax® system. The vision system process/processor 160 also operates a fiducial finder process/processor 170 according to an illustrative embodiment. This fiducial finder process/processor is described in detail below. The vision system process/processor and various sub-processes/processors receive user-defined information and/or parameters 180 to control various aspects of the system 100 and more particularly the fiducial finder process/processor 170

While many optical and viewing-angle-generated distortions can be addressed by camera calibration, it is recognized that the fiducial cross can appear to the vision system as an image in which the arms have uneven stroke width, regardless of the desired symmetry of the shape. This distortion can be due to a number of factors, often relating to the techniques in which the shape was printed/applied to the object surface. This can make it challenging to determine the pose of such a deformed fiducial using basic vision tools, that rely on concepts of affine transformation deformation along one or more degrees of freedom (i.e. change in scale, aspect ratio, translation, rotation and skew). As such it is highly desirable to provide an efficient and reliable, automated process and associated processor to identify and determine the pose of fiducials (shapes) that are shifted along one or more affine degrees of freedom (DOF) and exhibit non-linear distortion—such as varied arm stroke width in the case of a cross or like geometric shape and/or varied radius/radii in the case of a circle or annulus (termed herein "spline warp", e.g. where an O-shape can be partially flattened or vary between a regular and bold face appearance due to spline warpage).

II. Characterization of Fiducial/Shape Distortion Using Control Points

Figure 2:
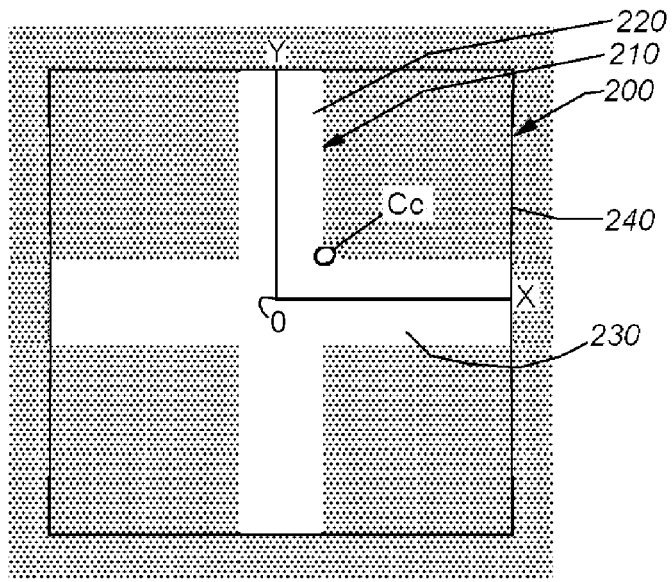
FIG. 2 is a diagram of an exemplary cross-shaped fiducial with relatively undistorted arms in an exemplary bounding box showing the operation of a control point and relative image axes in association with the fiducial finder of FIG. 1.

With reference now to FIG. 2, the depicted image 200 shows the cross fiducial 210 of unit width and height. More particularly, the illustrative image 200 and associated system and method represents fiducials or patterns as shapes within the unit bounding box 240. These shapes can be referred to as "unit fiducials". The depicted X and Y axes herein define the horizontal and vertical direction of the box 240 respectively, with the origin O coincident to the center of the box 240. A fiducial of desired shape for use by the illustrative system and method for determining pose is obtained by transforming the unit fiducial 210 with a 2D affine transform and a set of additional distortions. The additional distortions are controlled using a set of control points that allow the particular distortion to be categorized with a minimum of points. In the case of the exemplary cross 210, a single control point Cc with two DOFs (i.e. along the X and Y axes), located at the appropriate corner of the crossing vertical and horizontal arms 220 and 230, respectively, can sufficiently characterize and control distortions based upon variation of stroke width on each arm 220, 230. Likewise, the position, orientation and arm lengths are controlled by a 2D affine transform. The control point for the cross, Cc, lies on the upper right quadrant of the cross shape. As described further below, by constraining the control point for the cross to this quadrant, the system and method can prevent invalid control point configurations that can result in negative stroke widths.

Figure 3:
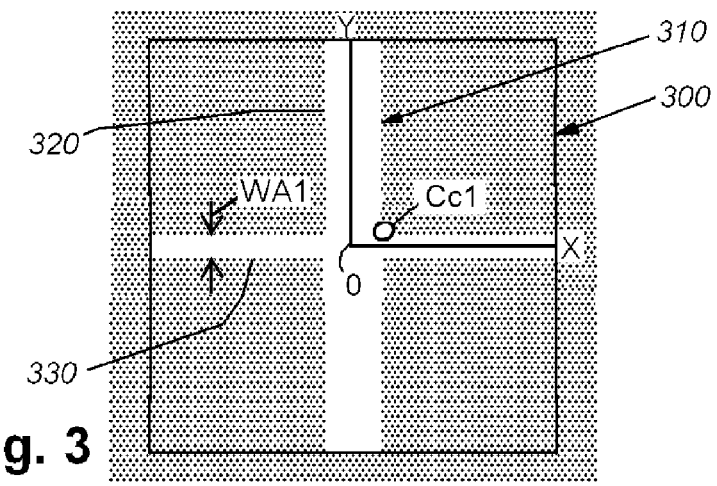
FIG. 3 is a diagram of an exemplary cross-shaped fiducial with a narrowed horizontal arm showing relocation of the control point depicted in FIG. 2 to accommodate such change in arm stroke width.
Figure 4:
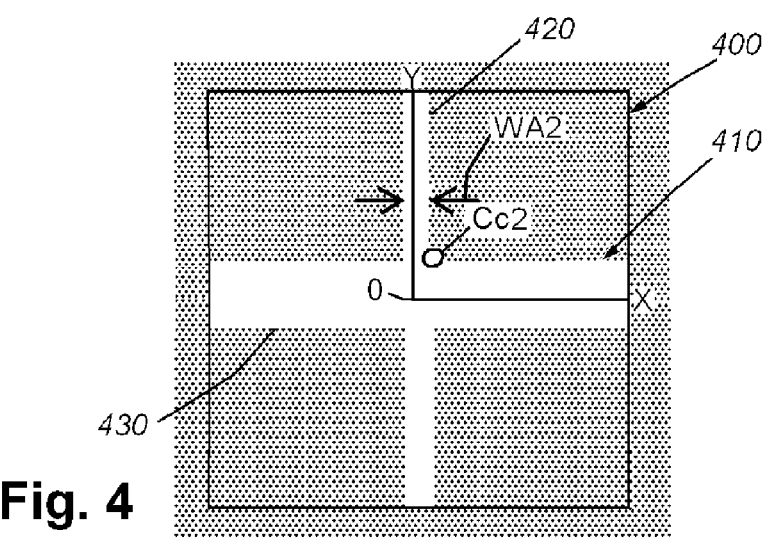
FIG. 4 is a diagram of an exemplary cross-shaped fiducial with a narrowed vertical arm showing relocation of the control point depicted in FIG. 2 to accommodate such change in arm stroke width.

As shown in the images 300 and 400 of respective FIGS. 3 and 4, the above-described cross has been distorted into cross shapes 310 and 410. By way of example, in cross shape 310 (FIG. 3), the horizontal arm 330 presents a narrower stroke width WA1, relative to the vertical arm 320; and in cross shape 410, the vertical arm 420 presents a narrower stroke width WA2 relative to the horizontal arm 430. In each representation, the respective control points Cc1 and Cc2 are shown displaced along two DOFs to characterize the change in stroke width in each arm. It should be clear that any relative stroke width in the cross can be characterized by appropriate positioning of the control point along the two DOFs.

Figure 5:
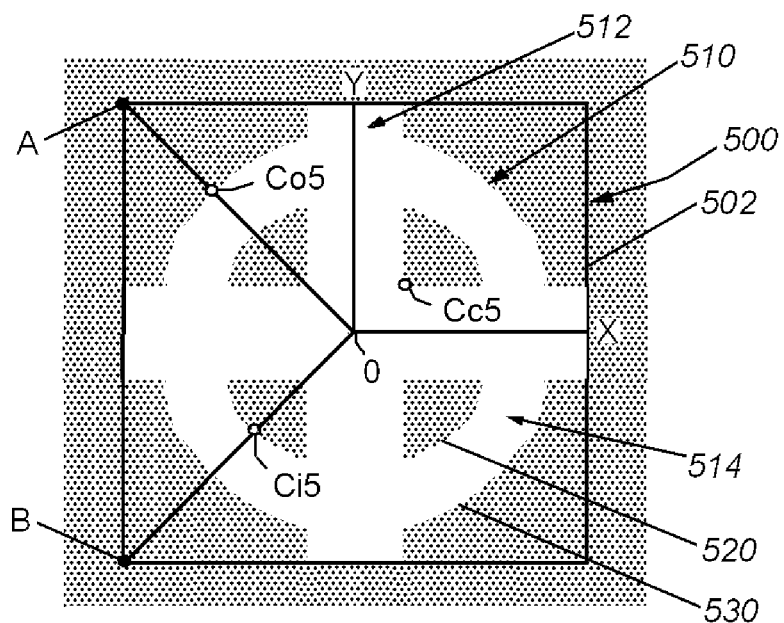
FIG. 5 is a diagram of an exemplary annulus (inner and outer circles) with cross fiducial showing the use of additional control points to characterize the circle according to an embodiment.

Reference is now made to FIG. 5, which further elaborates upon the concept of control points to define distortion in combined shapes. In this example, the image 500 of the unit fiducial within the unit bounding box 502 defines a cross (512) and annulus (514) shape 510. Traditional methods for finding a fiducial/shape containing both a cross feature and a circle feature have relied upon independently locating these elements. The illustrative embodiment locates both features in combination over a wide range of possible shape models using analysis of one or more control points that characterize the non-linear deformation (stroke width and/or spline warpage) and affine transformation along one or more 2D DOFs. The fiducial uses a 2D affine transform to control the location of the shape's position, its orientation, and the length of the arms of the cross. Illustratively, the fiducial contains three control points. Control point Co5 controls the radius of the outer annulus circle 530. Control point Ci5 controls the radius of the inner annulus circle 520. A third control point Cc5 controls the stroke width of the arms of the cross as described above.

Each control point also has a set of constraints on its position on the unit fiducial. Illustratively, the annulus' outer circle control point Co5 is constrained to lie on line segment OA, with O defining the origin of the shape and A defining one of the corners of the shape bounding box 502. The distance along OA from the center O to control point Co5Co5 represents the radius of the outer circle. By constraining the control point to lie on the line segment OA, the system is able to impose certain rules—such as preventing generation of a circle with negative radii, and/or a circle that extends outside the unit box 502. Similarly, the control point Ci5 is constrained to lie on the line segment OB. An additional constraint ensures that the distance of Co5 from O is greater than the distance of Ci5 from O, thus ensuring that the outer circle 530 does not define a radius that is less than that of the inner circle 520. The control point Cc5 for the cross 512 illustratively resides in the upper right quadrant of the pattern. As described above, this single control point can control the stroke widths of the horizontal and the vertical arms of the cross. By constraining the control point for the cross to a particular, predetermined quadrant, it prevents invalid control point configurations that can result in negative stroke widths. As defined herein the control point Co5, Ci5 for the radius of each circle is one DOF, and the control point for the cross is two DOFs. More generally, in the exemplary shape, the control point Co5 for the outer circle 530 of the annulus 514 can lie anywhere on line segment OA. The control point Ci5 for the inner circle 520 can lie anywhere on line segment OB, and the control point Cc5 for the cross 512 can lie anywhere in the (e.g.) upper right quadrant of the unit shape/fiducial 510.

Figure 6:
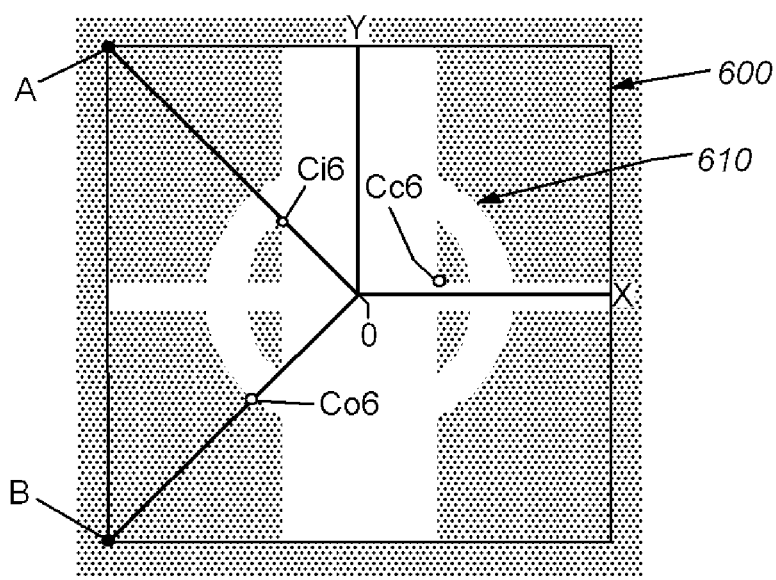
FIG. 6 is a diagram of an exemplary annulus (inner and outer circles) with cross fiducial, in which the widths vary from those depicted in FIG. 5, showing a new arrangement for the three control points used to characterize the circle and cross elements according to an embodiment.

With reference to FIG. 6, an image 600 of the same general cross and annulus fiducial 610 is shown with the annulus radii and arm stroke widths varied relative to the fiducial 510 of FIG. 5. The corresponding inner and outer circle control points Ci6 and Co6 are, thus, shifted along their DOFs on respective line segments OA and OB. Likewise, the cross control point Cc6 is shifted along the x and y-axis DOFs to characterize the distorted stroke width. Clearly, a circle and cross fiducial with any shape variation can be defined generally by the translation of the three control points Ci, Co and Cc with respect to their specified DOFs.

It should be clear from the foregoing that the use of control points allows generation of shapes that cannot be easily modeled algebraically, such as a unit cross with varying stroke widths, and/or a unit annulus with a differing/varying outer radius-to-inner radius ratio. Additionally, the techniques described herein provide a straightforward way to avoid illegal fiducial generation by ascribing certain constraints to the fiducial location (i.e. positioning of the control point(s) relative to the fiducial and to each other).

III. Fiducial/Shape Finding Process

Figure 7:
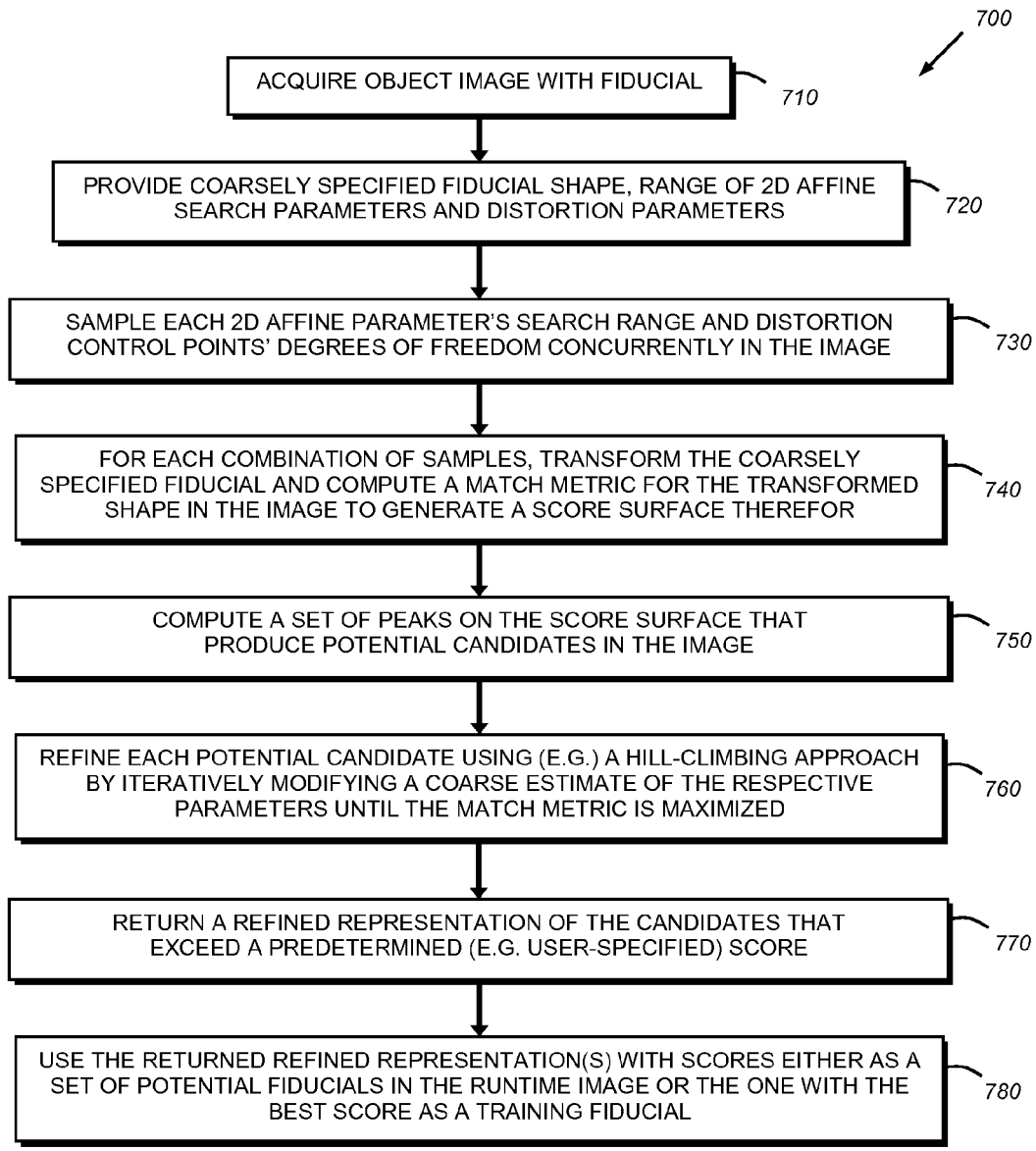
FIG. 7 is a flow diagram of an overall fiducial finding process for the system according to an illustrative embodiment.

Having described the use of control points within a unit bounding box containing an image of a predetermined (known) fiducial/shape to model distortion in the shape, reference is now made to FIG. 7, describing an overall process 700 for finding a fiducial/shape. In general, this process 700 enables the vision system to determine the pose/locate an object on the motion stage 122 by acquiring an image of the object 130 (step 710) with the above-described camera 110, and locating a fiducial/shape or pattern known to be on the object in an image of that object. The system and method of the illustrative embodiments described herein can locate fiducials/shapes or patterns that are distorted by a combination of a 2D affine transform and other additional distortions. It is assumed that both the range of possible distortions and the model of the additional distortions are known beforehand. By way of example, the techniques used herein can locate the above-described cross 140 which experiences a 2D affine transform (such as a change in its location, size, skew and orientation) and an additional distortion such as a change in the width of its arms. The process 700 models the change in the stroke width of the cross arms separately because without this it is not possible to model a set of crosses with the same 2D affine parameters such as the location, size, skew, and orientation, but with a difference in arm widths. The process 700 provides (step 720) a (typically user-specified and predetermined) specified shape of the fiducial, such as a cross; a coarse estimate of its affine parameters and control points; a range of 2D affine search parameters, such as the minimum and maximum size; and additional distortion search parameters to locate the fiducial.

In step 730, based upon the coarsely specified fiducial shape and parameters, the process 700 samples a set of 2D affine parameters and the distortion parameters concurrently (essentially simultaneously within the process). Based upon the sampling, the process 700 transforms (step 740) the coarsely specified shape by all combinations of these samples. In an embodiment, the parameters are sampled uniformly, but it is contemplated that other sampling techniques can be employed in further embodiments. The transformations are used to compute a match metric for the transformed shape in the image so as to generate a score surface.

In step 750, the process then computes a set of peaks on the score surface that produce potential candidates in the image. Once the set of candidates is identified, the 2D affine parameters and distortion parameters for each candidate is refined, and a better representation is generated (step 760). Illustratively a technique that is referred to in the art as hill climbing in used, in which the process iteratively modifies the coarse estimate of the parameters that is provided by the above candidates, until the match metric is maximized, which numerically represents the degree of similarity between the shape and the image of the fiducial. The match metric is described in further detail below.

In step 770, the process 700 returns a refined representation of the candidates that exceed a predetermined score threshold. This predetermined score threshold can be user-specified. In step 780, the returned refined representation can be used as a set of potential fiducials for the location of one or more fiducials in an acquired runtime image that has been distorted by a 2D affine transform and by other distortions that have been modeled by the fiducial. By way of example, and as described above, the process can be used at runtime to locate cross-shaped fiducials that experience arm width changes due (for example) to the printing process.

Alternatively, in step 780, the returned refined representation can be used to automatically generate a training fiducial—using the returned fiducial with the best score. Illustratively, the synthetic shape of the fiducial that is coarsely specified on its image by an operator can be refined. This can be facilitated by the operator using a mouse (192 in FIG. 1) or any other equivalent pointing device/user interface. This refined synthetic shape can be used to train any pattern search tool such as the well-known PatMax® tool or CNLSearch tool, both available from Cognex Corporation of Natick, Mass. The process 700 desirably enhances user-friendly setup and operation for the vision system in locating and aligning objects containing known fiducials by allowing them to be specified by the user with less precision. The process also significantly improves the quality of a synthetic shape used for training any pattern search tool because the synthetic shape very closely mirrors the actual shape in the image. If the specified shape and the image of the fiducial are within the search range specified by the 2D affine parameters and the control points, then the shape can "snap" onto the image precisely during a subsequent runtime operation, following training.

IV. Further Shapes

The following is a description of additional types of shapes to which the principles of the system and method can be applied, in addition to some general guidelines for applying the system and method to the subject shape, including the imposition of multiple constraints on the shape by imposing constraints on the associated control point location.

A. Circle with Cross

Figure 8:
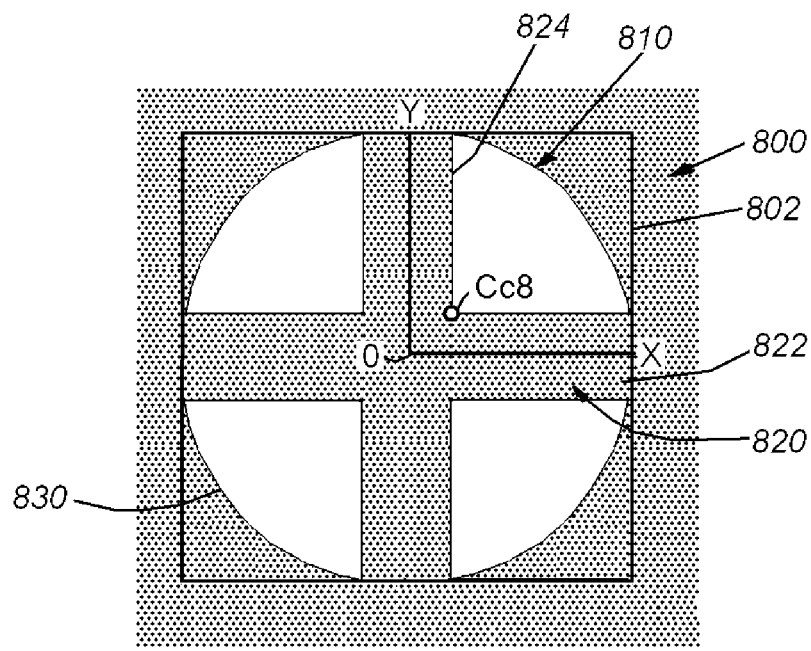
FIG. 8 is a diagram of an exemplary circle with cross fiducial with a control point to control the widths of the horizontal and vertical arms of the cross.

With reference to FIG. 8, an image 800 with a bounding box 802 of unit width and height along horizontal X and vertical Y axes defines a fiducial/shape 810 consisting of a combined unit circle 830 with unit cross 820. The origin O is coincident to the center of the box. The control point for the cross, Cc8, lies on the upper right quadrant of the pattern, similarly to other cross-shapes described above, and thus has 2 DOFs. This single control point Cc8 can control the stroke width of the horizontal arm, 822 and vertical arm 824 of the cross 830. As described above, by constraining the control point for the cross to this region, the system can prevent invalid control point configurations that can result in negative stroke widths. A 2D affine transform controls the position, orientation, and the arm lengths of the cross. The stroke widths of the horizontal and vertical arms are controlled by the control point Cc8 with two DOFs. The circle radius is a unit value, intersecting the bounding box 802.

B. Diamond with Cross

Figure 9:
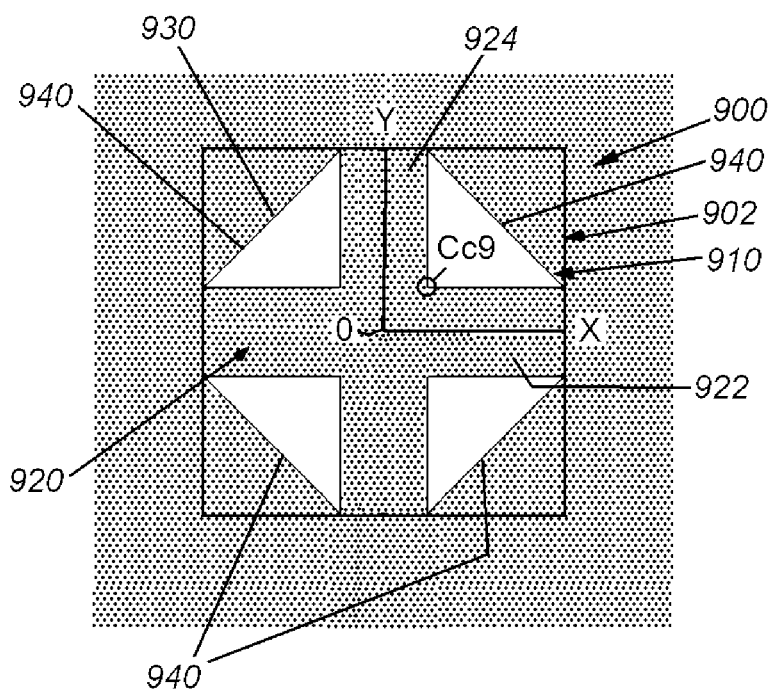
FIG. 9 is a diagram of an exemplary diamond with cross fiducial with a control point to control the widths of the horizontal and vertical arms of the cross.

With reference to FIG. 9, an image 900 with a bounding box 902 of unit width and height is shown, consisting of a fiducial/shape 910 in the form of a unit diamond 930 with unit cross 920. The X and Y axes are in the horizontal and vertical directions of the box 902, respectively, with the origin O coincident to the center of the box. The control point for the cross 920 Cc9, lies on the upper right quadrant of the pattern, and thus has two DOFs. This single control point Cc9 can control the stroke widths of the horizontal arm 922 and vertical arm 924 of the cross 920. By constraining the control point Cc9 for the cross 920 to this quadrant/region, the system effectively prevents invalid control point configurations that can result in negative stroke widths. A 2D affine transform controls the position, orientation, and arm lengths of the cross 920. The stroke widths of the horizontal and vertical arms are controlled by the control point Cc9. The line segments 940 of the diamond intersect the stroke width of the cross where it joins the unit bounding box 902.

C. Circle Inside Cross

Figure 10:
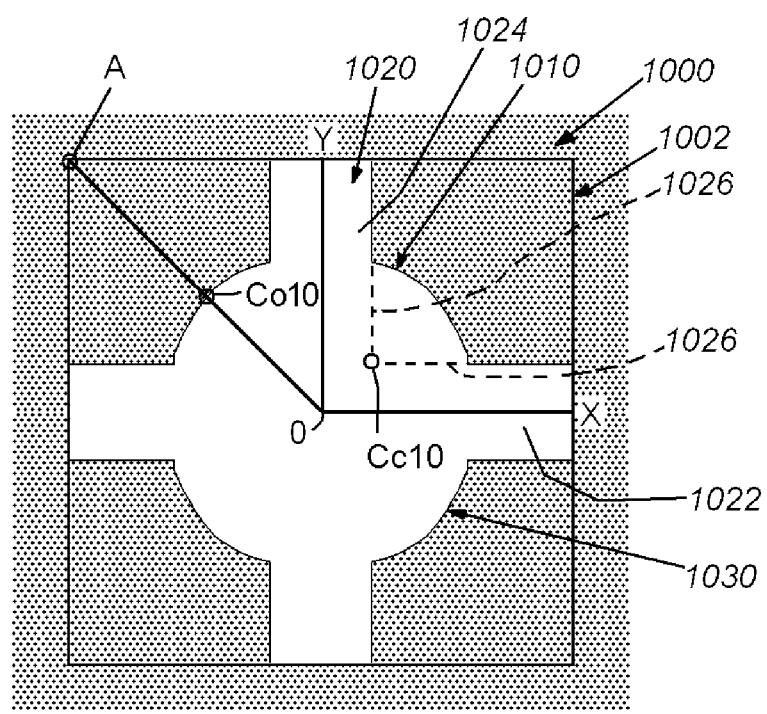
FIG. 10 is a diagram of another exemplary variation of a circle with cross fiducial with a control point to control the widths of the horizontal and vertical arms of the cross and a second control point to control the radius of the circle.

With reference to FIG. 10, the image 1000 includes a fiducial/shape 1010 that is bound by a bounding box 1002 of unit width and height. The X and Y axes are in the horizontal and vertical directions of the box 1002, respectively, with the origin O coincident to the center of the box 1002. The fiducial/shape 1010 consists of a unit cross 1020 and circle 1030, residing at a radius that is remote from, and inside, the box 1002. The control point Cc10 for the cross 1020 Cc10 resides on the upper right quadrant/region of the fiducial/shape pattern and thus has two DOFs. This single control point Cc10 can control the stroke widths of the horizontal arm 1022 and the vertical arm 1024 of the cross 1020. Note that the control point Cc10 is located at the intersection of the arms, which is denoted by the confluence of two dashed lines 1026 that extend into the region bounded by the circle 1030. By constraining the control point Cc10 for the cross 1020 to this region, the system effectively prevents invalid control point configurations that can result in negative stroke widths. The control point Co10 is constrained to lie on line segment OA, with O defining the origin of the bounding box 1002 and fiducial/shape and A defining one of the corners of the bounding box. The distance from the center/origin O to the control point Co10 represents the radius of the circle 1030. By constraining the control point to lie on the line segment OA, the system is able to impose rules/constraints such as preventing generation of a circle with negative radii, and/or a circle that extends outside the unit box 1002. A 2D affine transform controls the origin, orientation, and the arm lengths of the cross 1020.

D. Invalid Shapes

Figure 11:
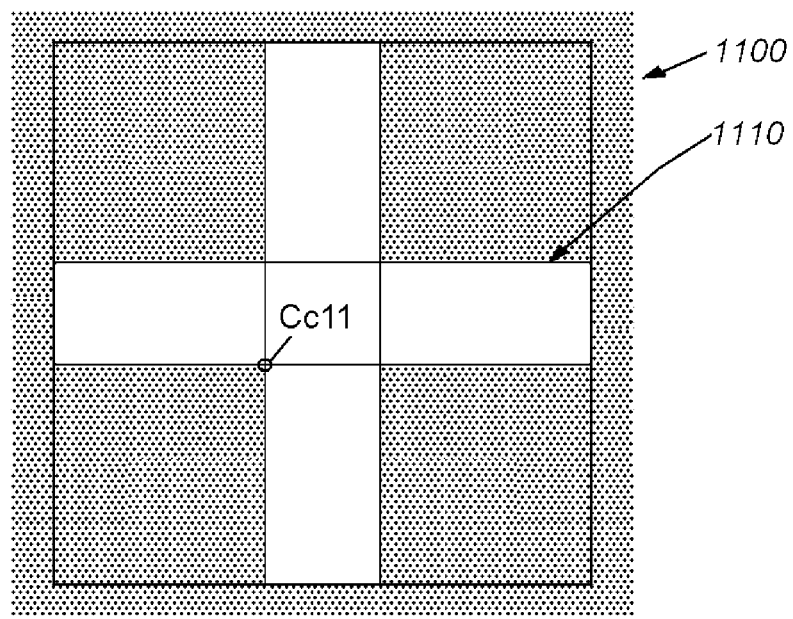
FIG. 11 is a diagram of an image of a fiducial generated by the process based upon a candidate shape in which the control point for a cross-shape is located in an incorrect quadrant of the intersection of arms, showing an invalid shape that can be discarded by the finding process.
Figure 12:
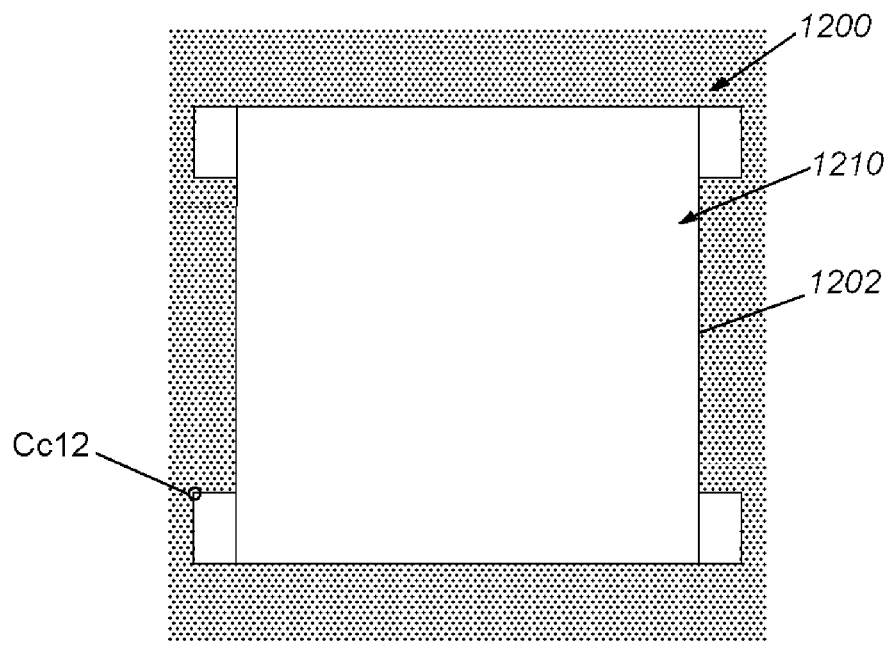
FIG. 12 is a diagram of an image of a fiducial generated by the process based upon a candidate shape in which the control point for a cross-shape is located outside the unit bounding box for the image, showing an invalid shape that can be discarded by the finding process.

As described above, control point locations that result in an invalid shape are avoided by the system and method. Such actions are undertaken by the fiducial renderer to be described further below. In general, the constraints placed on control points ensure that the fiducial renderer also indicates if any of the input control point positions will result in an invalid shape. For example, if for the unit cross fiducial, the control point migrates out of the illustrative top right quadrant (in this embodiment), which would result in negative stroke widths, then the fiducial renderer indicates an invalid control point configuration. FIG. 11 shows an image 1100 that in which the configuration generated by the control point Cc11 of a cross fiducial/shape 1110 is invalid. Such control point placement is avoided. Likewise, in FIG. 12, the image 1200 of the shape/fiducial 1210 that would normally specify a cross is shown, where the control point Cc12 resides outside the unit bounding box 1202. In both the configurations of FIG. 11 and FIG. 12, a clearly invalid shape is generated.

V. Fiducial Renderer, Location Inputs and Outputs

Figure 13:
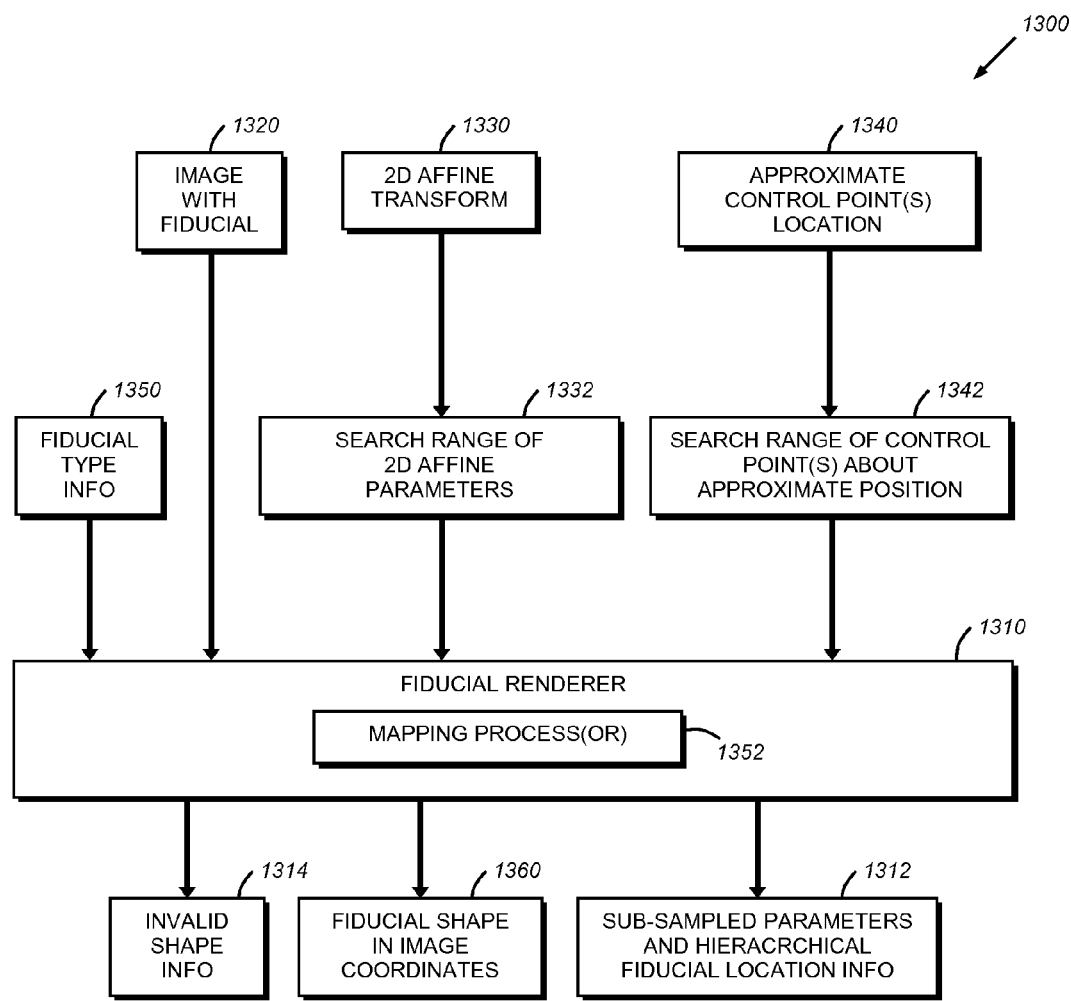
FIG. 13 is a block diagram of a fiducial renderer for locating a fiducial in an image with associated inputs and outputs.

FIG. 13 shows a block diagram representing a fiducial renderer 1310 and renderer process 1300. The fiducial renderer operates to render a fiducial given the position of the control points and a 2D affine transform. Additionally, given the search range of the 2D affine parameters, the control point positions and the image with the fiducial; the fiducial renderer 1310 can compute a sub-sampling parameter (described below) that can be used to subsample the image before running the shape location process using a shape locator that the renderer works in conjunction with. As such the renderer serves to speed the overall shape location process. Moreover, the renderer 1310 can be used for hierarchical fiducial location as described below (block 1312), and as described above, it can detect control point configurations that result in an invalid shape (block 1314).

As shown further in FIG. 13, the fiducial renderer 1310 receives input information from a plurality of sources. This information includes the image of the fiducial/shape to be located (block 1320) and a 2D affine transform that describes an approximate mapping between the unit fiducial/shape and the image of the fiducial (block 1330). As used herein, the values of the affine transform parameters for this transform can be referred to as their "nominal" values. Inputs to the renderer 1310 also include the search ranges for the 2D affine parameters about the specified approximate position (block 1332). Renderer inputs further include the approximate location of the distortion control points (block 1340). The location can be specified either on the unit fiducial or the image and is defined in terms of DOFs (e.g. X and Y axis coordinates). Illustratively, the process specifies the locations in the image. These control locations can be referred to herein as their "nominal" location. The search range for the control points about the specified approximate position is also input (block 1342).

The fiducial type (e.g. cross, circle with cross, diamond with cross, circle inside cross, etc.) (block 1350) is input to the renderer from a user-specified source, or other mechanism (e.g. automatic input). Given the fiducial type, the renderer 1310 runs a mapping process/processor 1352 that maps from the unit fiducial and control point positions to the image. Based upon this mapping, the renderer 1310 and mapping process 1352 compute the shape of the fiducial in image coordinates (block 1360) as an output.

V. Detailed Fiducial Finding Process

Figure 14:
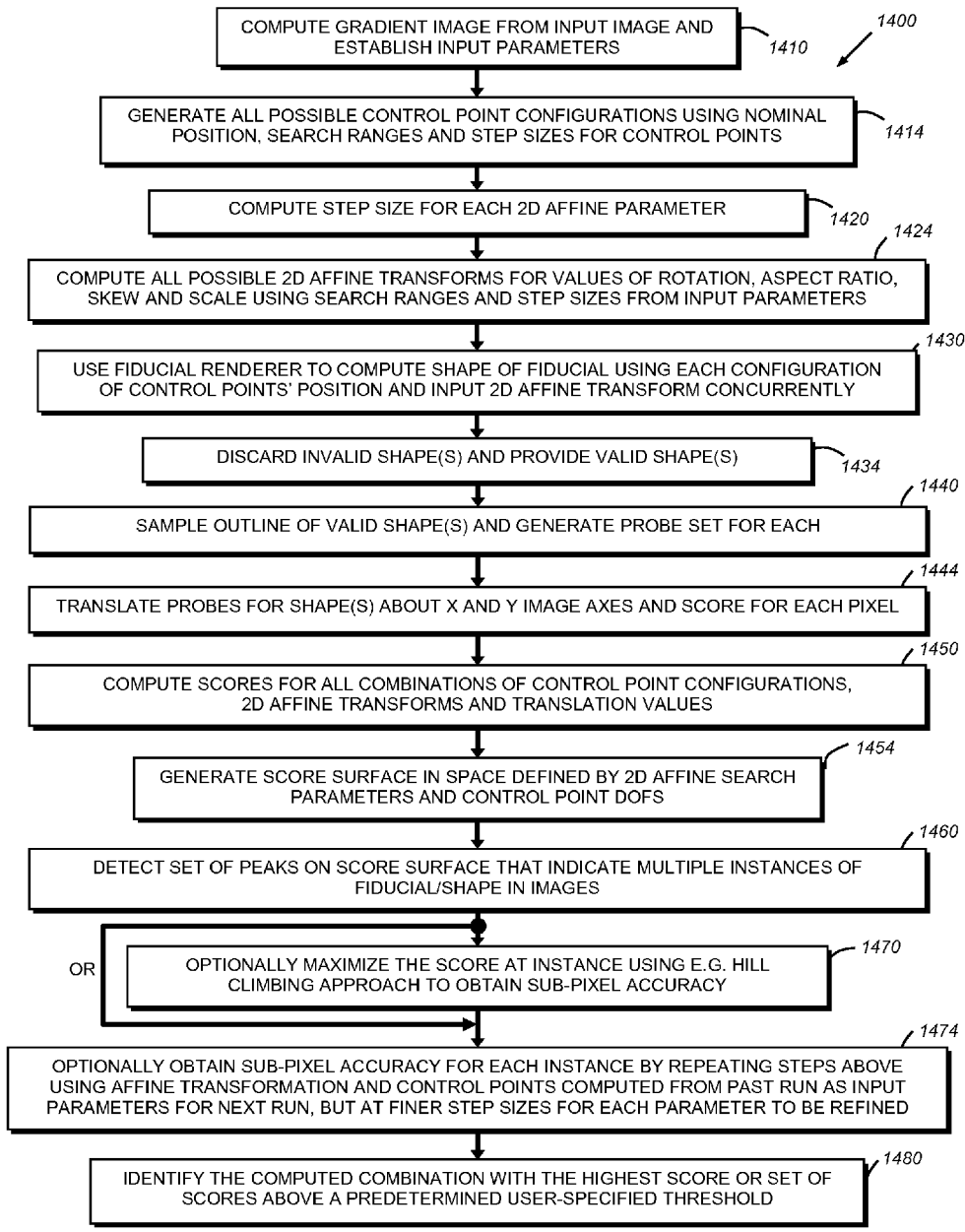
FIG. 14 is a flow diagram of an overall fiducial finding process for use in the system and method according to an illustrative embodiment.

With reference to the overall process 700 of FIG. 7 a more detailed description of the fiducial finding process 1400 is shown and described in FIG. 14. After acquiring an image of an object containing at least one fiducial within the imaged scene, gradient image is computed from the input image in step 1410. The nominal position of the control points, and the search ranges and step sizes for the control points, are used to generate all possible control point configurations in step 1414. The control points are moved in steps of one pixel in an embodiment, and thus the step size is one pixel, but it is contemplated that subpixel accuracy can be achieved as described further below. By way of example, if there are n control points, each with one DOF, and there are m search steps within the search range for each DOF, then there would be m×n control point configurations.

The step size for each 2D affine parameter is computed independently in step 1420, with all other affine parameters set at their nominal values. It is selected such that, for each step of the affine parameter, the point on the fiducial that is farthest from the origin moves by one pixel. All the possible 2D affine transforms for various values of rotation, aspect ratio, skew and scale, using their respective search range and step sizes are computed in step 1424. For each configuration of a control point's position from step 1414 and the input 2D affine transform from step 1424, the shape of the fiducial is computed using the fiducial renderer 1310 (FIG. 13) in step 1430. If a configuration of control point positions result in an invalid shape (which is a function carried out by the fiducial renderer at block 1314 in FIG. 13 by detecting an invalid combination of control points), then the invalid configuration is discarded in step 1434. Valid shapes/configurations are preserved for further processing.

The outline of one or more valid fiducial shape(s) is/are sampled and a set of probes is generated at step 1440 and the probes are mapped using 2D affine transform computed in step 1424 using the fiducial renderer. In step 1444 the probes are translated about the X and Y image axes in steps of (e.g.) one pixel, and the score for each translation value is computed. This score is for the shape generated by the combination of control point configuration, 2D affine transform from step 1424, and translation value. The scores for all combinations of control point configurations, 2D affine transforms and translation values are computed in step 1450. This allows generation of a score surface in space defined by the 2D affine search parameters and control point DOFs in step 1454. The process 1400 also detects a set of peaks on the score surface that indicate multiple instances of the fiducial/shape in the image. This information can be used to align multiple fiducials and/or select one instance for alignment (step 1460).

Figure 15:
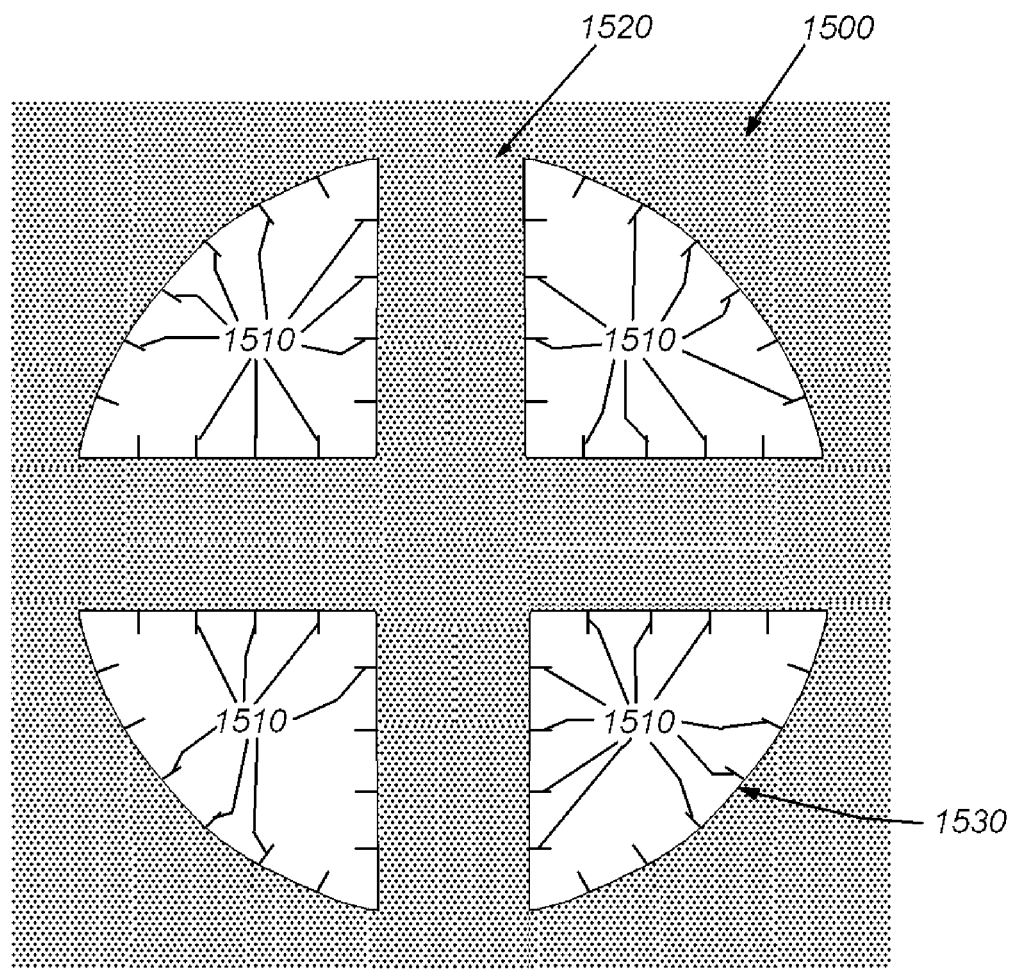
FIG. 15 is a diagram of an exemplary circle with cross fiducial showing a graphical representation of the application of probes by the fiducial finding process to locate the outline shape of the fiducial according to an illustrative embodiment.
Figure 16:
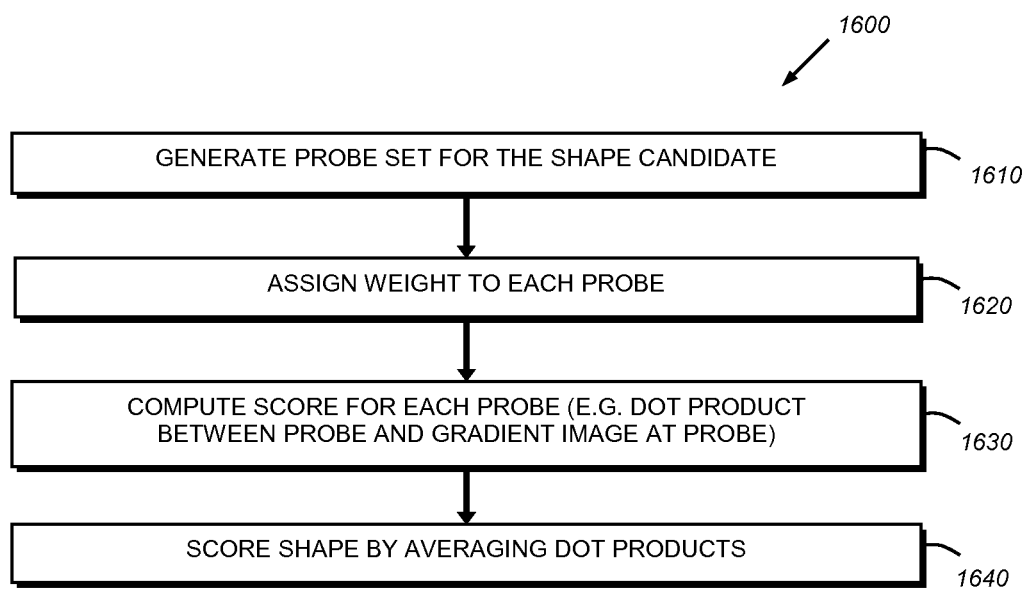
FIG. 16 is a flow diagram of a fiducial shape candidate scoring process for use by the fiducial finding process according to an illustrative embodiment.

With further reference now to FIGS. 15 and 16, an exemplary cross with circle image 1500 with probes and procedure 1600 for score generation are described in further detail. Illustratively, the score for a shape is a numerical measure of the similarity between the shape, and the pattern in the run-time image being located by the vision system. The scoring process 1600 outlines the steps followed by the technique to compute the score. The gradient image computed from the input image in step 1410 is used in the process. Each pixel in the gradient image is a 2D vector where the first component is the horizontal derivative at the corresponding pixel location and the second component is the vertical derivative. There are many techniques to compute the gradient image. In an embodiment, the scoring process 1600 computes the gradient image by convolving the input image with two 3×3 kernels known in the art as Sobel operators.

The horizontal gradient is computed by convolving the input image with the following kernel:

$$\begin{bmatrix} 1 & 0 & -1 \\ 2 & 0 & -2 \\ 1 & 0 & -1 \end{bmatrix}$$

The vertical gradient is computed by convolving the input image with the following kernel:

$$\begin{bmatrix} 1 & 2 & -1 \\ 0 & 0 & 0 \\ -1 & -2 & -1 \end{bmatrix}$$

The outline of the shape is sampled and a set of probes is generated for the shape of the candidate in step 1610. Each probe is a data structure that has a position, direction and magnitude. The position is the sample position; and the direction is normal to the shape, and points in a direction that is determined by the polarity of the shape. In step 1620, the scoring process 1600 technique assigns unit magnitude to the probes, but it is contemplated that different weights can be assigned to the probes in alternate embodiments in order to weight some probes more heavily in the scoring if desired. In the image 1500 of an exemplary circle with cross fiducial/ shape in FIG. 15, the probes 1510 are graphically illustrated as lines extending from the edges of the cross 1520.

The score for a probe is computed as the dot product between the probe and the gradient image at the probe's location in step 1630. If the probe falls between pixel boundaries, the gradient at the probe's location is obtained by interpolating from the neighboring pixels. It is contemplated that one or more of a variety of different techniques of interpolation can be employed. In an illustrative embodiment the process 1600 interpolates the horizontal and vertical gradients separately using a technique known in the art as bilinear interpolation. The score for the shape is the average value of the dot products between all the probes and the interpolated gradient values at their corresponding locations in the gradient image (step 1640). Therefore, given n probes, each with a direction ($x_{pi}$, $y_{pi}$, $0 < i < n$, and the gradient values at the corresponding location, ($x_{gi}$, $y_{gi}$, $0 < i < n$, the score is computed using the equation:

$$\frac{1}{n}\sum_{i=0}^{n-1} x_{pi} \cdot x_{gi} + y_{pi} \cdot y_{gi}$$

If the user chooses to ignore the polarity, the score for the shape is the average value of the absolute value of the dot products between all the probes and the interpolated gradient values at their corresponding locations in the gradient image, as provided by the modified equation below:

$$\frac{1}{n}\sum_{i=0}^{n-1} |x_{pi} \cdot x_{gi} + y_{pi} \cdot y_{gi}|$$

Having derived the score surface in step 1454 and detecting peaks on the score surface that can indicate multiple instances of the fiducial/shape, in conjunction with the process 1600, the process 1400 now can optionally obtain sub-pixel accuracy. This can be achieved using two alternative steps 1470 or 1474. In optional step 1470, the process maximizes the score at the instance of the fiducial or shape by using a hill climbing approach with the above result serving as a starting point. The hill is spanned by the 2D affine search parameters and control point DOFs.

In alternative step 1474, the process 1400 can obtain sub-pixel accuracy for each fiducial/shape instance from step 1460 by running the above fiducial finding steps (e.g. steps 1414-1460) multiple times on the acquired and gradient images, but with each iterative run using the affine transform and control points (results) computed from the previous/past run as the input parameters in the subsequent/next run of the process steps (1400). The step sizes for each successive run are taken at progressively finer step sizes for each parameter to be refined, eventually generating a sub-pixel-accurate representation. Then, in step 1480 the process 1400 identifies the computed combination with the highest score or set of scores (as appropriate) that exceeds (is above) a predetermined user-specified threshold. This is returned as the representation.

VI. Automatic Sub-Sampling Parameter Generation

In order to locate the fiducial faster, the system can run the fiducial finder process (1400) on a sub-sampled image and obtain a coarse estimate of the fiducials location. This result can be refined by running the tool on a version of the image that has not been sampled using a narrower 2D affine parameter and control point range. The sub-sampling size is governed by the width of the narrowest feature on the fiducial. If the sub-sampling size is too large, this narrow feature might be lost, thus resulting in a poorer performance.

The fiducial renderer 1310 can be used to automatically compute the sub-sampling size. This is because for a given 2D affine mapping between the image and the unit fiducial, and control point positions, the fiducial renderer is capable of computing the width of the fiducial's narrowest feature. The sub-sampling size is selected such that this narrow feature is preserved. By way of example, for a cross fiducial/shape, the 2D affine transform parameter and the control point position are used to compute the stroke width of the arms of the cross. The process uses the width of the narrower arm to generate the sub-sampling size.

VII. Hierarchical Fiducial Location

Figure 17:
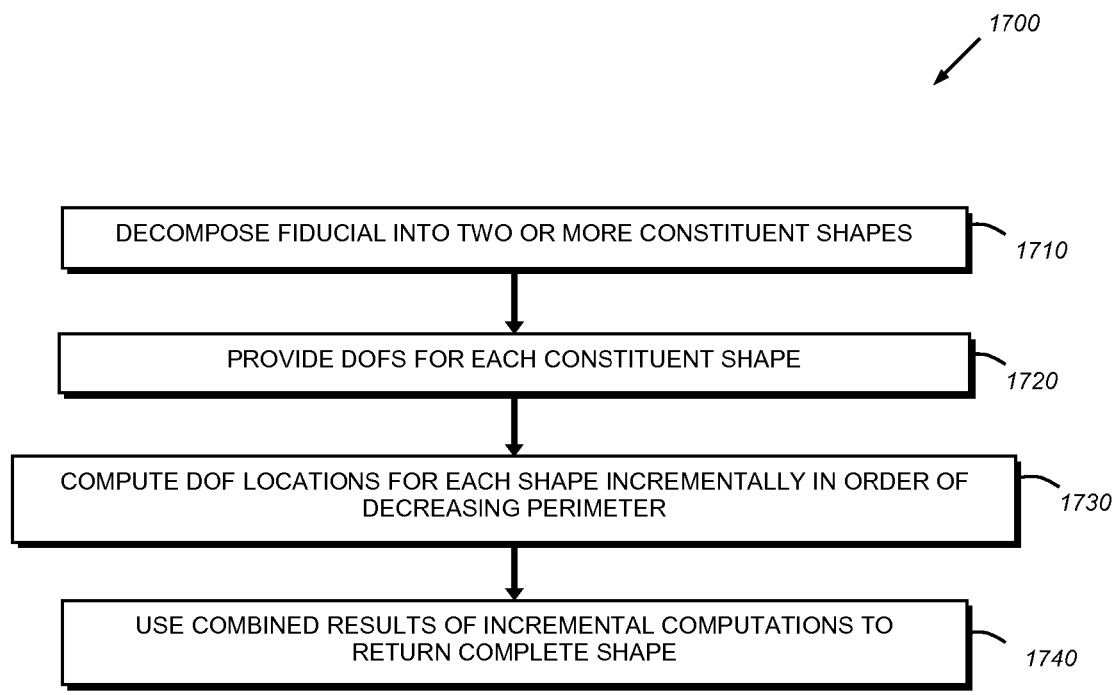
FIG. 17 is a flow diagram of a hierarchical fiducial location process in which a more complex shape is decomposed by the fiducial renderer of FIG. 13 into more basic shapes to increase the robustness and decrease running time for the fiducial location process.

The running time of the fiducial finder depends upon the number of control points utilized. If there exist n control points each with one DOF, and there are m search steps within the search range for each DOF, then there would be $m^n$ control point configurations. Therefore, the running time increases exponentially with the number of control points. The illustrative hierarchical process herein allows the system to compute the DOFs for the fiducial location incrementally. This is accomplished, as indicated in block 1312 and the process 1700 of FIG. 17 by directing the fiducial renderer 1310 to break up (decompose) the fiducial into simpler (more basic) constituent shapes (step 1710. Along with decomposing a fiducial into simpler shapes, the renderer returns a corresponding set of DOFs that can be computed for each simple shape (step 1720). The DOFs for each simple shape is a subset of the overall set of DOFs that have to be refined to locate the fiducial. Computing the DOF values incrementally (step 1730) reduces the run-time for fiducials that can be represented by simpler shapes. For a shape with n control points that can be broken into p simpler shapes with a maximum of q control points, the run time is reduced from $O(m^n)$ to $O(m^q)$, where m is the number of search steps within the search range for each DOF. The system processes the simpler shapes in order of decreasing perimeter. Once the individual shapes are computed incrementally, this combined result is used in other steps to compute the score and select the fiducial candidates. In general, the process 1700 increases the robustness of the fiducial location.

Figure 18:
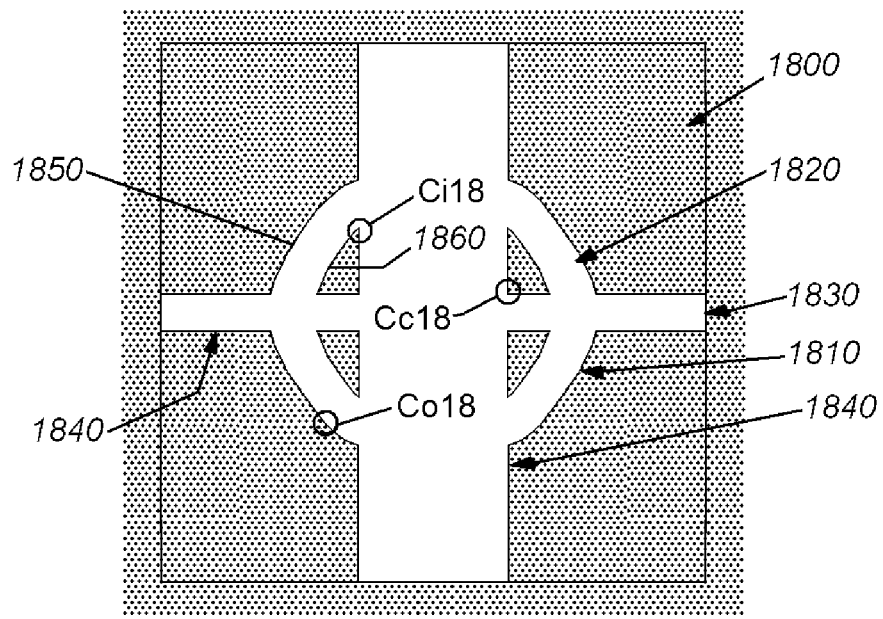
FIG. 18 is an exemplary annulus with cross fiducial showing the elements of the fiducial that are broken up by the renderer to implement hierarchical fiducial location in order to speed system location time, according to an illustrative embodiment.
Figure 19:
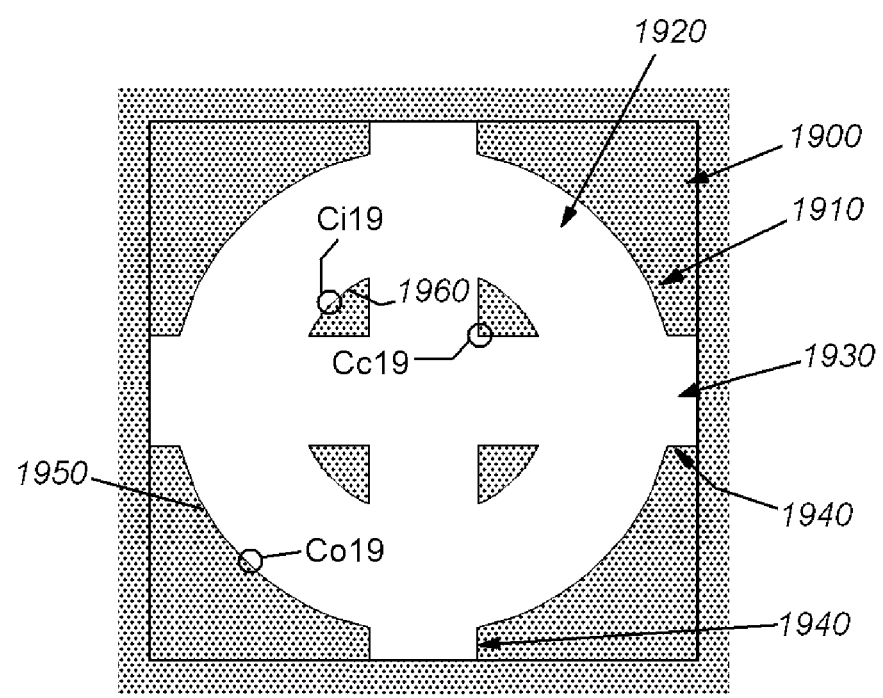
FIG. 19 is another exemplary annulus with a differing arrangement of a cross and annulus also showing elements that are broken up by the renderer, and for which DOFs are computed in a different order than for the fiducial of FIG. 18, to implement hierarchical fiducial location, according to an illustrative embodiment.

Illustratively, the images 1800 and 1900 of FIGS. 18 and 19 define different arrangements of the same fiducial type 8910, 1910 (e.g. an annulus 1820, 1920 with cross 1830, 1930, respectively). The complexity of this exemplary fiducial location is $O(m^3)$. Referring particularly to FIG. 18, the fiducial renderer 1310, thus, decomposes and represents the shape 1810 as a composition of a discrete cross with arms 1840, an outer circle 1850 and the inner circle 1860. For this configuration the corresponding DOFs that are computed (step 1730) comprise rotation, scale, aspect ratio, skew, translation (via affine transformation) and cross stroke widths (via control point Cc18 with two DOFs in X and Y); outer circle radius (via control point Co18 with one DOF); and inner circle radius (via control point Ci18 with one DOF) in this listed order. The complexity of fiducial location is O(m).

Referring now to FIG. 19, the fiducial renderer 1310 again decomposes the shape 1910 into the discrete, more basic shape of an outer circle 1950, cross 1930 with arms 1940 and inner circle 1960. For this configuration the corresponding DOFs that are computed (step 1730) comprise translation, aspect ratio, skew and outer circle radius (via control point Co19 with one DOF); rotation and stroke width (via control point Cc19 with two DOFs); and inner circle radius (via control point Ci19 with one DOF) again in the listed hierarchical order. Note that the order changes based on the relative size of each basic shape versus the representation of FIG. 18. Finding the DOFs corresponding to the dominant shapes first should generally increase system robustness while reducing the running time for the fiducial finder. The complexity of fiducial location in this example is also O(m).

VII. Conclusion and Alternate Embodiments

It should be clear that the above described fiducial location and pose determination system and method provides an effective and efficient technique for enabling alignment of objects with certain types/arrangements of fiducials/shapes that can undergo deformation in addition to affine transformation. This technique can be made more accurate and faster by use of sub-sampling procedures in addition to hierarchical fiducial location, breaking up the fiducial image into constituent, simpler geometric shapes and solving for those shapes.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components. Also, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, while certain control point constraints (e.g. the placement of the cross control point in the upper right quadrant) are described herein, it is expressly contemplated that alternate constrains can be employed, such as placement of a control point in a different quadrant or at a specified distance along one or more DOF from the actual location of, for example, an arm intersection. Accordingly, this description is meant to be taken only by way of example, and not to otherwise limit the scope of this invention.

What is claimed is:

1. A method for automatically determining pose of a shape undergoing a combination of affine deformation and non-linear deformation with a vision system comprising the steps of:
    acquiring an image, with an image sensor, of an object containing the shape;
    performing a coarse location of the shape to identify and select at least one shape candidate matching a predetermined shape;
    refining the affine parameters and non-linear distortion parameters for the best matching candidate shape; and
    generating a shape representation of at least one refined best matching candidate shape,
    wherein the non-linear deformation is defined by at least one of stroke width and spline warp.

2. The method as set forth in claim 1 wherein the affine deformation is defined by one or more two-dimensional (2D) affine degrees of freedom.

3. The method as set forth in claim 2 wherein the step of performing coarse location comprises moving at least one control point relative to the predetermined shape iteratively to a plurality of control point configurations from a nominal position over a plurality steps based on a predetermined step size and search range and, for each control point configuration, iteratively computing affine transforms relative to the predetermined shape over a plurality of steps based upon a predetermined step size and search range for at least one affine degree of freedom (DOF).

4. The method as set forth in claim 3 wherein the shape defines a cross with orthogonally oriented arms each defining a stroke width and at least one control point defined by a single point located at an intersecting corner of the arms.

5. The method as set forth in claim 4 wherein the control point is located in a predetermined quadrant with respect to the arms thereby defining a valid shape.

6. The method as set forth in claim 4 wherein the shape defines a circle or annulus combined with the cross and further comprising another control point, respectively located on each edge of the circle or annulus.

7. The method as set forth in claim 3 further comprising discarding control point configurations that result in an invalid shape.

8. The method as set forth in claim 3 further comprising (a) decomposing the shape into more basic constituent shapes and defining an order of processing based upon a predetermined hierarchy and, (b) for each more basic shape moving at least one control point relative to each more basic shape iteratively to a plurality of control point configurations from a nominal position over a plurality of steps based on a predetermined step size and search range and, (c) for each control point configuration, iteratively computing affine transforms relative to the more basic shape over a plurality of steps based upon a predetermined step size and search range for at least one affine degree of freedom (DOF).

9. The method as set forth in claim 8 wherein the step of decomposing is performed by a fiducial renderer and the hierarchy comprises and order from shape with largest perimeter to shape with smallest perimeter.

10. The method as set forth in claim 3 wherein the step of performing the coarse location comprises searching a user-specified search range of affine parameters and non-linear distortion parameters.

11. The method as set forth in claim 3 further comprising computing a score for each of a plurality of combinations of control point configurations and affine transforms and providing therefrom a score surface in space spanned by affine DOFs and control point DOFs, and selecting a set of peaks on the score surface and refining each peak.

12. The method as set forth in claim 11 wherein the steps of selecting and refining each peak further comprise selecting one or more of the highest-scoring of the combinations as the shape representation or to locate multiple instances of the shape in the image.

13. The method as set forth in claim 11 wherein the step of computing the score comprises generating a gradient image and defining probes along edges of the gradient image.

14. The method as set forth in claim 13 the step of computing the score is based upon an average value of a dot product between the probes and interpolated gradient values at corresponding locations in the gradient image.

15. The method as set forth in claim 14 wherein the step of computing the score comprises maximizing the score using a hill climbing approach.

16. The method as set forth in claim 3 further comprising performing the steps of performing and refining, at progressively finer step sizes, iteratively to obtain at least one subsampled image pixel candidate shape.

17. The method as set forth in claim 2 wherein the shape representation is used as a model image in at least one of a runtime fiducial location operation and generation of a synthetic fiducial image model.

18. The method as set forth in claim 1 further comprising establishing a boundary around the shape and establishing a unit shape relative to the boundary.

19. The method as set forth in claim 1 wherein the shape representation is used to locate one or more fiducial/shape during run time operation of the vision system or to refine a synthetic shape based upon the image of the fiducial/shape for training a vision system tool.

20. A system for automatically determining pose of a shape undergoing a combination of affine deformation and non-linear deformation with a vision system comprising:

a vision system camera assembly that acquiring an image of an object containing the shape;

a vision system processor that performs a coarse location of the shape to identify and select at least one shape candidate matching a predetermined shape;

a refining process that refines affine parameters and non-linear distortion parameters for the best matching candidate shape that generates a shape representation of at least one refined best matching candidate shape, wherein the non-linear deformation is defined by at least one of stroke width and spline warp.

21. A method for automatically determining poses of one or more instance of a shape undergoing a combination of affine deformation and non-linear deformation with a vision system comprising the steps of:

acquiring an image, with an image sensor, of an object containing the shape;

performing a coarse location of the shape to identify and select at least one shape candidate matching a predetermined shape;

refining the affine parameters and non-linear distortion parameters for the best matching candidate shape; and generating a shape representation of at least one refined best matching candidate shape, wherein the non-linear deformation is defined by at least one of stroke width and spline warp.

* * * * *